May 3, 1938.  B. F. MONEY  2,116,036
LOCK NUT
Filed April 14, 1937
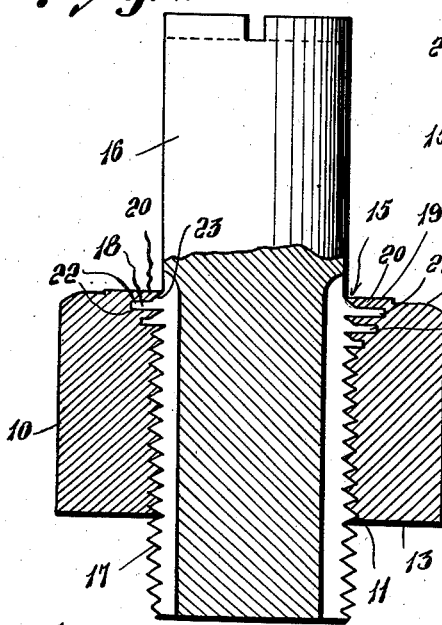
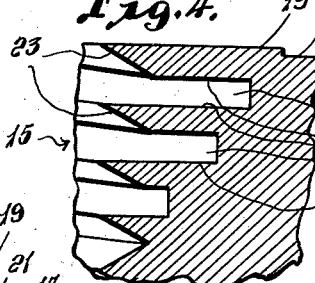
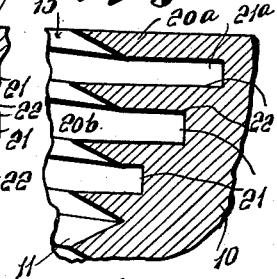
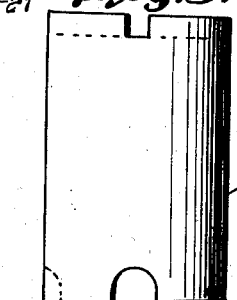
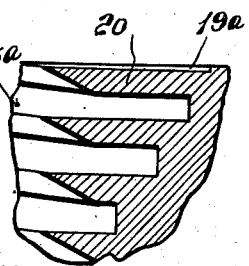
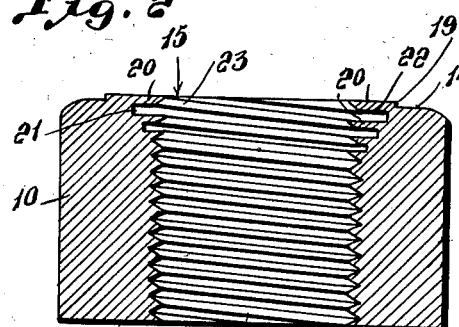
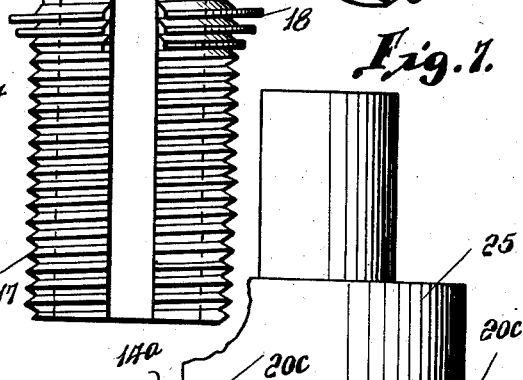
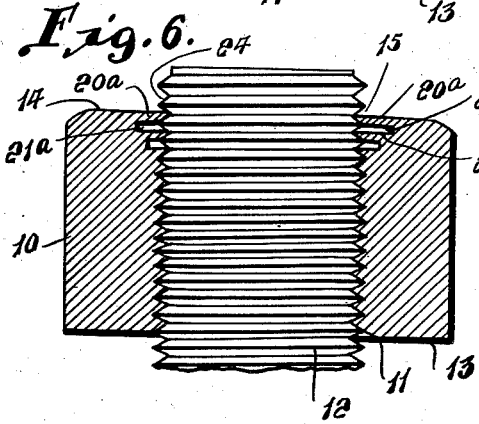
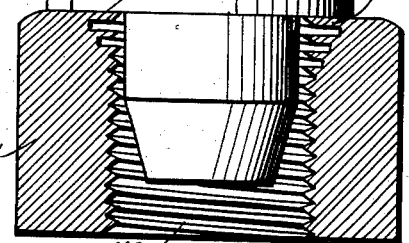
B. F. Money,
Inventor.
By V. R. Bryant,
Attorney.

Patented May 3, 1938

2,116,036

UNITED STATES PATENT OFFICE 2,116,036

LOCK NUT

Benjamin F. Money, Tulsa, Okla., assignor of thirty one-hundredths to Charles R. Terry and thirty one-hundredths to Albert Cohan, both of Tulsa, Okla.

Application April 14, 1937, Serial No. 136,890

2 Claims. (Cl. 151—21)

This invention relates to certain new and useful improvements in lock nuts.

The primary object of the invention is to provide a lock nut adapted for association with a threaded bolt or the like wherein the threads of the bolt are of standard construction, certain threads of the nut being of standard construction for engagement with the bolt threads, while other threads of the nut adjacent the top thereof are of different construction to produce frictional or binding engagement when said last named threads of the nut move into engagement with the threads of the bolt to hold the nut against rotation on the bolt.

A further object of the invention is to provide a lock nut of the foregoing character wherein at least one of the threads of the nut and preferably a plurality of threads adjacent the top of the nut are deeply cut or milled between the threads to provide a series of relatively thin threads of blade-like formation with pressure exerted on the top of the nut to move at least the top thread of blade-like formation in a direction toward the bottom of the nut to place the uppermost thin thread closer to the adjacent thin thread than the spaced relationship between the other threads for placing the uppermost thin thread out of true pitch with the other threads whereby frictional contact is established between the thin threads of the nut and the lower walls of the threads of the bolt for holding the lock nut on the bolt against accidental rotation, wrench pressure being required for applying and removing the nut after the thin threads of the nut have been moved into engagement with the threads of the bolt to restore the thin threads of the nut to true pitch with respect to the standard threads of the nut and bolt with the inherent resiliency of the thin threads permitting flexure thereof to produce frictional engagement between the thin threads of the nut and the standard threads of the bolt.

A further object of the invention is to provide an improved construction of nut threading die to produce a lock nut of the foregoing character wherein the die has a thread cutting section to produce standard threads in the nut with cutting or milling fingers at the upper end of the thread cutting section of the die for cutting or milling out the material between one or more threads at the upper end of the nut to produce the thin threads of blade-like formation.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a vertical cross-sectional view of a lock nut and thread cutting die and illustrating the milling fingers or cutters at the upper end of the standard thread cutting zone of the die for producing the thin threads of resilient blade-like formation at the upper end of the nut with an upstanding annular shoulder on the top of the nut surrounding the threaded bore;

Figure 2 is a vertical sectional view of the lock nut shown in Figure 1, with the thread cutting die removed;

Figure 3 is a side elevational view of the thread cutting die;

Figure 4 is an enlarged fragmentary sectional view of the nut showing the thin threads at the top of the nut and the upstanding annular shoulder that forms the upper side of the top thin thread;

Figure 5 is an enlarged fragmentary sectional view similar to Figure 4 with the upstanding annular shoulder swaged or pressed downwardly to present a substantially level surface at the top of the nut and to lower at least the top thread into closer relationship with the adjacent thin thread than the distance between other threads;

Figure 6 is a vertical cross sectional view of the completed lock nut showing the uppermost thin thread at the top of the nut slightly flexed upwardly to increase frictional engagement between said thread and the standard thread of a bolt shank that is fragmentarily illustrated as threaded in the nut;

Figure 7 is a vertical cross-sectional view of a lock nut similar to Figure 2, but with the upstanding annular shoulder omitted and with a punch positioned in the threaded bore of the nut for depressing the top thin thread; and Figure 8 is an enlarged fragmentary sectional view of the completed lock nut shown in Figure 7 and illustrating an annular depression surrounding the threaded bore of the nut at the top thereof.

Referring more in detail to the accompanying drawing and particularly to Figures 1 to 6, the reference character 10 designates a nut having a threaded bore 11 for mounting on the threaded shank 12 of a bolt. The threaded bore 11 of the nut is divided into two zones of different thread characteristics, the threaded zone opening at the bottom 13 of the nut being of standard construction or normal pitch while the threaded zone opening at the top 14 of the nut which comprises at least one thread and preferably several threads is slightly out of pitch with the standard thread zone and embodies one or more threads of thin characteristics and of inherently resilient blade-like formation designated in general by the reference character 15.

The thread cutting die for producing the two zones of different thread characteristics in the nut is shown in Figs. 1 and 3 and comprises a shank 16 having the lower end thereof provided with spaced longitudinal sets of teeth 17 for cutting the standard threads 11 in the nut with a plurality of spirally arranged cutting or milling fingers 18 at the upper end of the thread cutting finger 17 for producing the zone of thin threads of blade-like formation 15 shown in Figure 2, the thread cutting die being shown in Figure 1 as engaged with the nut 10.

As shown more clearly in Figures 2 and 4, the top 14 of the nut 10 carries an upstanding annular shoulder 19 surrounding the threaded bore of the nut, the milling fingers 18 on the thread cutting die producing the thin resilient threads 20 in the thread zone 15 and defining relatively deep cut channels 21 between the thin threads 20 with the walls 22 of the thin threads 20 parallel with the top wall 14 of the nut, the milling cutters 18 providing undercut bevelled edges 23 at the free edges of the thin blades 20.

Pressure is exerted on the top and bottom walls of the nut 10 shown in Figures 2 and 4, as by passing the nut between compressor rollers for moving the upstanding annular shoulder 19 at the top of the nut downwardly into the body of the nut as shown in Figures 5 and 6 to cause the top thread 20a shown in Figure 5 to be moved into closer relationship with the adjacent thread 20b thereby narrowing the channel 21a between the thin threads 20a and 20b with respect to the channels 21 between the other thin threads and slightly moving the uppermost thin thread 20a out of pitch with the thread 20b and the threads of the standard zone 11 of the nut.

The completed nut as shown in Figure 6 may be initially threaded by hand onto the threaded bolt 12 until the thin thread zone 15 moves into engagement with the bolt threads and at which time hand wrench or other power pressure is required to thread the nut onto the bolt. The bevelled free edges 23 of the thin threads move into engagement with the walls 24 of the bolt threads 12 and continued threading movement of the nut onto the bolt causes the thin threads 20 and especially the uppermost thin thread 20a to be slightly flexed and restored to true pitch relative to the other threads and thereby produce frictional engagement between the thin threads of the nut and the standard threads of the bolt for retaining the lock nut on the bolt against accidental rotation. The nut is capable of being locked upon the bolt without the necessity of moving the nut into engagement with an abutment of any character, the thin threads constituting the locking element, and as stated, requiring wrench pressure or other power for threading the nut onto and off of the bolt. The resiliency of the thin blade-like threads 20 increases friction between the lock nut and bolt for the retention of the nut on the bolt against displacement.

In the form of invention shown in Figures 7 and 8, the nut 10a has a standard thread zone 11a and a thin thread zone 15a at the top 14a. In this form of the invention, the top 14a of the nut 10a is free of the shoulder 19 shown in Figures 1 to 6 and normally has a flat top. A punch 25 is inserted in the top of the nut 10a and percussive force exerted on the punch lowers at least the uppermost thin thread 20c to move the same slightly out of pitch with the remaining threads of the nut and producing a comparatively shallow channel or depression 19a surrounding the threaded bore of the nut. In all other respects, the nut 10a functions in a manner similar to the nut 10 shown in Figures 1 to 6.

While there are herein shown and described the preferred embodiments of the present invention, it is nevertheless to be understood that minor changes may be made therein without departing from the spirit and scope of the invention as claimed.

I claim:—

1. In a lock nut of the character described, the combination with a threaded bolt, of a nut having threads to engage the threads of the bolt, a plurality of the threads of the nut adjacent the top of the nut being deep cut and relatively thin in comparison to the remaining threads of the nut, the group of thin threads being slightly depressed to successively occupy positions out of true pitch with the other threads of the nut and the threads of the bolt whereby frictional contact is established between said thin threads of the nut and the lower walls of the threads of the bolt.

2. A nut lock of the character set forth in claim 1, characterized by the thin threads having substantially parallel upper and lower faces and with the thin threads being undercut at their free edges to form bevelled faces to increase the area of frictional contact of the thin threads with the lower walls of the threads of the bolt.

BENJAMIN F. MONEY.